US010083695B2

(12) United States Patent
Buffum et al.

(10) Patent No.: US 10,083,695 B2
(45) Date of Patent: Sep. 25, 2018

(54) DIALOG-BASED VOICEPRINT SECURITY FOR BUSINESS TRANSACTIONS

(71) Applicant: EMC IP Holding Company LLC, Hopkinton, MA (US)

(72) Inventors: Chuck Buffum, San Jose, CA (US); Jared Levy, Mountain View, CA (US); Nathaniel Calvin, Sunnyvale, CA (US); Craig Gould, Campbell, CA (US); Jeff King, Mountain View, CA (US); David Lipin, San Carlos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 818 days.

(21) Appl. No.: 13/680,938

(22) Filed: Nov. 19, 2012

(65) Prior Publication Data

US 2013/0080166 A1     Mar. 28, 2013

Related U.S. Application Data

(63) Continuation of application No. 10/213,486, filed on Aug. 6, 2002.
(Continued)

(51) Int. Cl.
*H04L 29/06*     (2006.01)
*G10L 17/06*     (2013.01)
(Continued)

(52) U.S. Cl.
CPC .............. *G10L 17/06* (2013.01); *G06F 21/32* (2013.01); *G06Q 20/4014* (2013.01); *G07C 9/00158* (2013.01)

(58) Field of Classification Search
USPC ............................... 713/186; 902/3; 704/273
See application file for complete search history.

(56) References Cited

U.S. PATENT DOCUMENTS 5,548,647 A * 8/1996 Naik et al. .................... 704/200
5,687,287 A * 11/1997 Gandhi et al. ................ 704/247
(Continued)

OTHER PUBLICATIONS

Higgins et al. "SpeakerVerification Using Randomized Phrase Prompting", Digital Signal Processing, vol. 1, Issue 2, Apr. 1991, pp. 89-106.*
(Continued)

*Primary Examiner* — Jeffery Williams
(74) *Attorney, Agent, or Firm* — Ryan, Mason & Lewis, LLP

(57) ABSTRACT

A system for biometrically securing business transactions uses speech recognition and voiceprint authentication to biometrically secure a transaction from a variety of client devices in a variety of media. A voiceprint authentication server receives a request from a third party requestor to authenticate a previously enrolled end user of a client device. A signature collection applet presents the user a randomly generated signature string, prompting the user to speak the string, and recording the user's as he speaks. After transmittal to the authentication server, the signature string is recognized using voice recognition software, and compared with a stored voiceprint, using voiceprint authentication software. An authentication result is reported to both user and requestor. Voiceprints are stored in a repository along with the associated user data. Enrollment is by way of a separate enrollment applet, wherein the end user provides user information and records a voiceprint, which is subsequently stored.

20 Claims, 6 Drawing Sheets

Related U.S. Application Data

(60) Provisional application No. 60/312,363, filed on Aug. 14, 2001.

(51) Int. Cl.
*G06F 21/32* (2013.01)
*G06Q 20/40* (2012.01)
*G07C 9/00* (2006.01)

(56) References Cited

U.S. PATENT DOCUMENTS

| | | | |
|---|---|---|---|
| 5,774,525 A * | 6/1998 | Kanevsky et al. | 379/88.02 |
| 5,805,674 A | 9/1998 | Anderson, Jr. | |
| 5,806,040 A | 9/1998 | Vensko | |
| 5,897,616 A * | 4/1999 | Kanevsky et al. | 704/246 |
| 6,009,392 A | 12/1999 | Kanevsky et al. | |
| 6,092,192 A * | 7/2000 | Kanevsky et al. | 713/186 |
| 6,094,632 A * | 7/2000 | Hattori | 704/239 |
| 6,107,935 A | 8/2000 | Comerford et al. | |
| 6,182,076 B1 | 1/2001 | Yu et al. | |
| 6,213,391 B1 | 4/2001 | Lewis | |
| 6,219,639 B1 | 4/2001 | Bakis et al. | |
| 6,246,751 B1 | 6/2001 | Bergl et al. | |
| 6,256,737 B1 | 7/2001 | Bianco et al. | |
| 6,292,782 B1 | 9/2001 | Weideman | |
| 6,496,800 B1 | 12/2002 | Kong et al. | |
| 6,510,236 B1 | 1/2003 | Crane et al. | |
| 6,510,415 B1 | 1/2003 | Talmor et al. | |
| 6,529,871 B1 | 3/2003 | Kanevsky et al. | |
| 6,671,672 B1 | 12/2003 | Heck | |
| 6,681,205 B1 | 1/2004 | San Martin et al. | |
| 6,691,089 B1 | 2/2004 | Su et al. | |
| 6,697,779 B1 | 2/2004 | Bellegarda et al. | |
| 6,968,453 B2 | 11/2005 | Doyle et al. | |
| 6,973,575 B2 | 12/2005 | Arnold | |
| 7,158,776 B1 * | 1/2007 | Estes et al. | 455/411 |
| 7,225,134 B2 | 5/2007 | Kamiya | |
| 2001/0000045 A1 | 3/2001 | Yu et al. | |
| 2001/0039619 A1 | 11/2001 | Lapere et al. | |
| 2002/0091753 A1 | 7/2002 | Reddy et al. | |
| 2002/0104025 A1 | 8/2002 | Wrench, Jr. | |
| 2002/0104027 A1 | 8/2002 | Skerpac | |
| 2002/0157090 A1 | 10/2002 | Anton, Jr. | |
| 2002/0194499 A1 | 12/2002 | Audebert et al. | |
| 2003/0023882 A1 | 1/2003 | Udom | |
| 2004/0250085 A1 | 12/2004 | Tattan et al. | |
| 2010/0156596 A1* | 6/2010 | Herder | 340/5.82 |

OTHER PUBLICATIONS

Microsoft, "Microsoft Computer Dictionary" 5th ed., 2002, Microsoft Corp., p. 349.*
Gralla, Preston, "How the Internet Works, 7th ed.", 2004, Que Publishing, pp. 6-13.*
Newton, Harry, "Newton's Telecom Dictionary, 20th ed.", 2004, CMP Books, pp. 142, 819, 820.*
Adler, Richard, "Distributed Coordination Models for Client/Server Computing", 1995, IEEE, p. 14-22.*
R. Cole, Ed, et al., "Survey of the State of the Art in Human Language Technology," National Science Foundation, 1995, pp. 1-502.
H. Newton, "Newtons Telecom Dictionary," Telecom Books, 1998, 3 pages.

* cited by examiner

DIALOG-BASED VOICEPRINT SECURITY FOR BUSINESS TRANSACTIONS

CROSS REFERENCE TO RELATED APPLICATIONS

This application claims priority to U.S. Provisional Patent Application No. 60/312,363, filed Aug. 14, 2001.

BACKGROUND OF THE INVENTION

Field of the Invention

The invention relates generally to the field of biometric authentication. More particularly, the invention relates to a system and method for securing business transactions using dialog-based voice recognition and voiceprint authentication.

Description of Related Technology

The ability to positively and reliably authenticate an individual is of utmost importance in areas such as e-commerce and financial services provided in a networked environment. Conventional shared secret authentication technology involves numerous disadvantages that motivate a continuing search for more reliable authentication technologies. For example, passwords and PIN's (personal identification number), while easily implemented, are easily compromised. Often, workplaces having aggressive password policies requiring passwords to be changed frequently also discourage easily remembered passwords. Thus, the inconvenience of trying to remember a password is such that end-users often write their password down so that they won't forget it. It is extremely common to see a user's password displayed in their office in plain view, perhaps on a POST-IT note affixed to their desk. Furthermore, replacing the passwords of those who have forgotten theirs is a significant expense in many organizations. The same problems are encountered in e-commerce and financial service environments. Conventional authentication methods render it relatively simple for a party to masquerade as someone else, resulting in serious invasions of privacy, and often inflicting grave financial or reputational harm.

Biometric authentication, the use of unique physical characteristics to verify an individual's identity, is receiving an increasing amount of attention. The use of fingerprints to positively identify an individual has been known for several hundred years. T. Tabuki, Verification server for use in authentication on networks, U.S. Pat. No. 5,987,232 (Nov. 16, 1999) describes the use of signatures to authenticate users requesting network access. The user records his or her signature by means of an electronic signature tablet. The recorded signature is then verified on a verification server. R. Glass, M Salganicoff, U. Cahn von Seelen, Method and apparatus for securely transmitting and authenticating biometric data over a network, U.S. Pat. No. 6,332,193 (Dec. 18, 2001) describes use of a retinal scan to authenticate a user requesting network access. Y. Yu, S. Wong, M. Hoffberg, Web-based, biometric authentication system and method, U.S. Pat. No. 6,182,076 (Jan. 30, 2001) describes a biometric authentication architecture implemented as middleware that employs encryption and passwords to lessen the possibility that a user's biometric data will be compromised while being transmitted to an authentication center.

A disadvantage to most current biometric authentication technologies is that they are subject to compromise. A user's biometric data can be intercepted and misused in the same way that a password can. In order to minimize such possibility, as described in the references above, measures must be taken to make sure that the biometric data is securely transmitted, and is authentic, requiring measures such as encryption, watermarking and passwords. It would be advantageous to provide a simple, reliable way of minimizing the possibility that biometric data has been compromised, or is not authentic.

Another disadvantage of most biometric authentication schemes is that the biometric templates are stored independently of their associated user data. The biometric data received from a user desiring authentication is first matched with a template from the template database. Subsequently, the individual associated with the matching template is provided. While such methodology is well suited for biometric identification, it is resource intensive. It would be desirable to provide a way of granting direct access to particular user's biometric template without first matching the templates.

Biometric authentication schemes are often implemented as middleware in a network environment. It would be desirable to provide a server-based architecture wherein the server is optimized for biometric authentication.

A still further disadvantage to most biometric authentication schemes is that they require dedicated sensing devices, such as specialized cameras for retinal scans and digitizing tablets for signatures. Often these devices are difficult to implement and maintain, requiring special software drivers and frequent calibration and adjustment. Thus, it would be an advance to provide a means of biometric authentication that doesn't require specialized input devices Use of biometric authentication has been limited to granting access, often to a data network. It would be desirable to provide security for business transactions over either voice or data networks based on biometric authentication.

SUMMARY OF THE INVENTION

A system for biometrically securing business transactions uses speech recognition and voiceprint authentication to biometrically secure a transaction from a variety of client devices in a variety of media. A voiceprint authentication server receives a request from a third party requestor, often a server running a business application, to authenticate a previously enrolled end user of a client device. In response, the authentication server instantiates a signature collection applet on the client device. Any client having audio recording capabilities, a software environment and memory capable of running the applet, readable configuration data that can serve as a device signature, and the ability to send the signature is suitable for the invention. During an interactive dialog, the signature collection presents the user a randomly generated signature string, prompting the user to speak the string, and recording the user's utterance as he speaks. The dialog-driven nature of the signature gathering process, coupled with the use of a randomly generated signature string, provides an important liveness check. While the invention is completely compatible with industry standards for secure transmission and digital signatures, the liveness check provides a high degree of security for the collected voice data independently of other security measures.

After being transmitted to the authentication server, the signature string is first recognized using voice recognition software, and the string subsequently compared with a stored voiceprint, using voiceprint authentication software. Based on the comparison, an authentication result is reported to the user and the requestor. Voiceprints are stored in a repository along with the associated user data. The invention is capable of operating over one or both of a data network and a voice network.

Enrollment is by way of a separate dialog-based enrollment applet, wherein the end user provides user information and records a voiceprint, which is subsequently stored.

DETAILED DESCRIPTION

The invention provides a system and method that use voice recognition and voiceprint technologies to biometrically secure transactions from a variety of devices over a variety of media. The system, as described herein below, is compatible with industry standards for secure transmission, digital signatures, etc., and can be combined with other biometric and data security techniques to provide improved levels of security to a variety of transactions, for example electronic business transactions.

Figure 1:
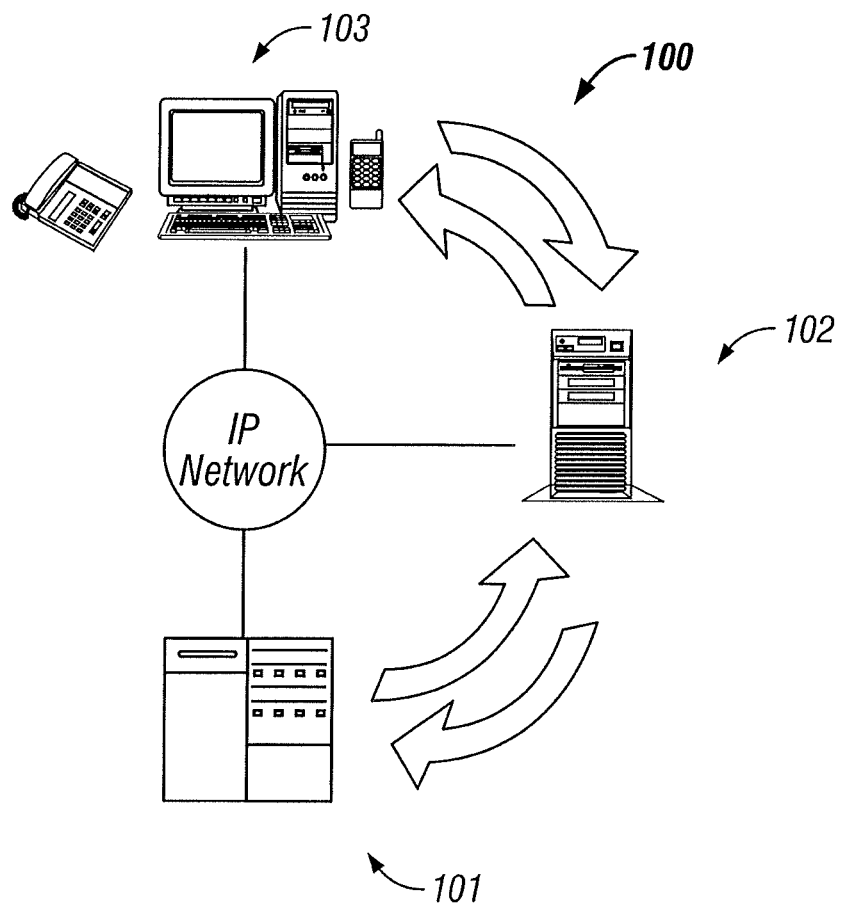
FIG. 1 provides a functional flow diagram of a system for biometrically securing business transactions using speech recognition and voiceprint authentication according to the invention.

Referring now to FIG. 1, shown is a functional flow diagram of the invented system 100.

Figure 4A:
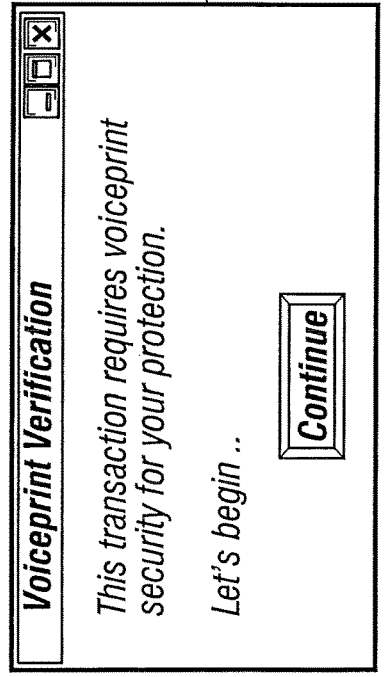
FIGS. 4A-C show a series of screen shots corresponding to the steps of an authentication process according to the invention.
Figure 4B:
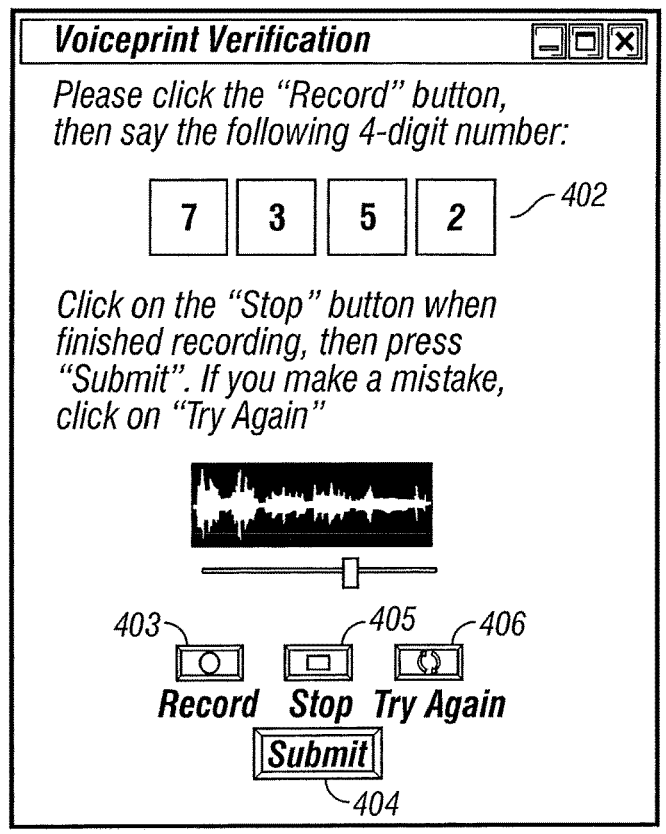
Figure 4C:
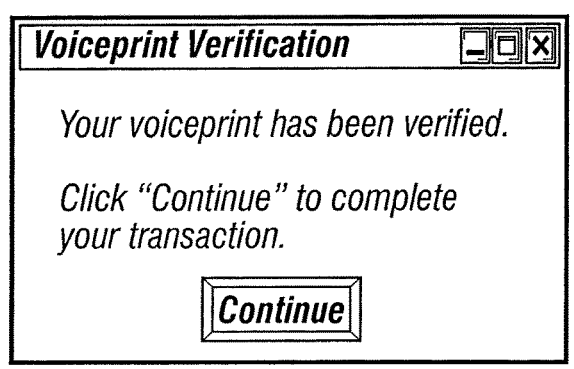

1. Request for authentication:
    Any business application 101, running on any server, can request authentication for any specific pre-enrolled user at any time. This may occur prior to transaction completion (e.g., checkout a shopping cart, trade stocks, transfer funds). The business application requests authentication by signaling the voiceprint server with an identifier for a specific user at a specific network address.
2. Serve up signature collection applet.
    A voiceprint server 102 instantiates a signature collection applet on a client device 103 at the network address provided by the business application. There are several varieties of the applet, depending upon the kind of end-user device (PC, Palm, telephone, etc.) and the software supporting the business transaction on that device (browser, client software, etc.). Any client having audio recording capabilities, a software environment and memory capable of running the applet, readable configuration data that can serve as a device signature, and the ability to send the signatures is suitable for the invention. FIGS. 4A-C provide screen shots of an exemplary user interface to the signature collection applet. As FIG. 4A shows, the signature collection applet alerts the user, giving the user the option to continue 401. Following the initial alert, the voiceprint server 102 randomly generates a signature string used to collect speech data by the signature collection applet.
3. The applet collects a voice and data signature.
    The signature collection applet (device- and software-specific) renders a dialog box on the client device displaying the randomly generated string 402, prompting the user to click the 'record' button 403, and speak the signature string 402 into the device microphone. The dialog box prompts the user to click a 'stop' button when finished recording 405 and then click a 'submit' button 404. (FIG. 4B). In the event that the user needs to repeat the process he starts over by clicking a 'try again' button 406.

In the case of a telephone device, the system calls the device and asks the end-user to speak the signature string.

The applet uses device-specific recording objects to record the speech as an audio file, for example a .wav file, although other file formats are consistent with the spirit and scope of the invention. The applet also reads the device configuration data (e.g., Windows registry) to generate a device signature.

The user's signature audio file and device's configuration data are sent by the applet to the voiceprint server 102. While the data transfer and authentication processing is occurring, the applet displays a "processing" message (not shown) on the end-user device 103.
4. The authentication server receives the audio file and device configuration from the applet.

The server passes the audio file, device configuration, and signature string to the speech recognition and voiceprint authentication software, and requests recognition with respect to the recorded signature string and verification with respect to the specific user's voiceprint (already on record, as described below).

The speech recognition software returns a recognition result that is compared against a configurable recognition confidence level; and the voiceprint authentication software returns a verification result that is compared against a configurable verification confidence level. If both confidence levels exceed established thresholds, the server determines that the user is authenticated. If the confidence levels of both results are below their minimum respective thresholds (also configurable), the user is rejected as an imposter. If one or both of the confidence levels are between the threshold values, the voiceprint server generates a new random signature string and retries the process. The number of retries is configurable.

When the server has made its determination, the authentication result is sent to the applet, as shown in FIG. 4C. The applet displays the result ("You have been authenticated" or "We were unable to authenticate your voice") and then terminates. In addition, the voiceprint server sends the authentication result to the business application.

Figure 2:
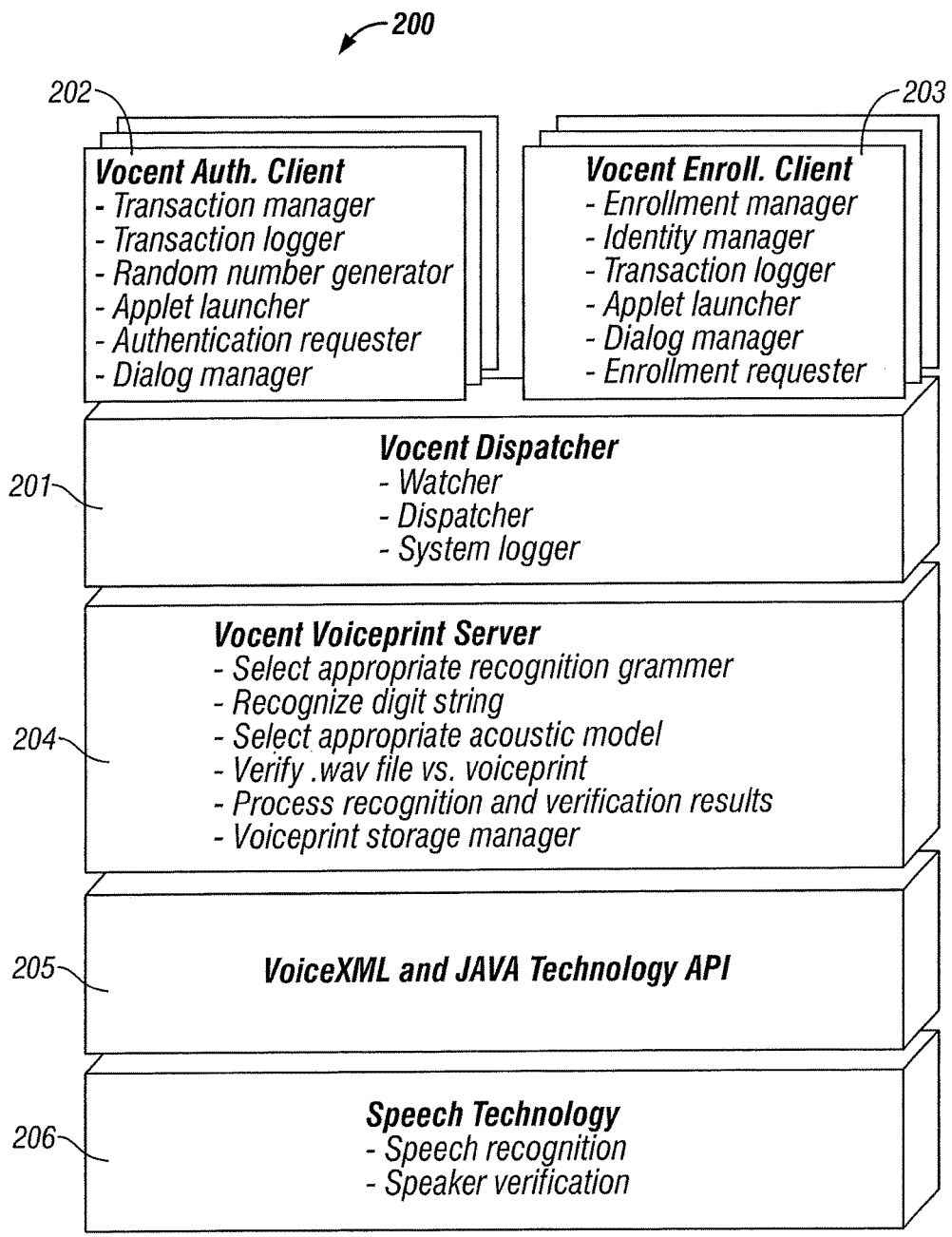
FIG. 2 illustrates the architecture of a voiceprint authentication server according to the invention.

Referring now to FIG. 2, shown is a block diagram that illustrates the various server-side 200 components:

DISPATCHER (201). Sub-components within the dispatcher include:
    A load balancer—receives authentication requests and directs them to available authentication clients 202;
    A system logger—logs system load data for performance and data analysis; and
    A watcher—starts and shuts down authentication clients in response to system demand, terminates unresponsive authentication clients, and restarts authentication clients that terminate abnormally.

AUTHENTICATION CLIENT (202). Sub-components within the authentication client include:
    A transaction manager—receives authentication request from the business application 101, responds to progress queries from the business application, and returns the authentication result to the business application;

A logger—logs the authentication transaction data for performance and data analysis;

A random signature generator—generates the random signatures for use by the signature collection applets;

An applet launcher—using device configuration data and the network address, the applet launcher serves up the appropriate signature collection applet to the end user device and receives the signature files from the applet. It also sends the authentication result to the applet for display;

An authentication requestor—passes the audio file to the voiceprint server along with the user id requesting recognition and verification results. Uses device signature, as appropriate, to identify best acoustic models for recognition and verification; and A dialog manager—stuffs dialog box content into the applets. Evaluates recognition and verification results as compared to configured thresholds. Determines the authentication result and the potential need for retries. Interacts with other client components to manage the data and decision flow.

ENROLLMENT CLIENT (203). Sub-components within the enrollment client include:

An enrollment manager—receives enrollment request and device specific data from the user, manages the dialog with the user, and confirms the completion of the enrollment process;

A logger—logs the enrollment transaction data for performance and data analysis;

An identity manager—manages the user-specific data necessary to confirm the identity of the user during the enrollment process;

An applet launcher—using device configuration data and the network address, the applet launcher serves up the appropriate applet (enrollment, FIG. 3) to the end user device and receives the signature files from the applet. It also sends the enrollment result to the applet for display;

An enrollment requestor—passes the audio file to the voiceprint server along with the user identity information requesting recognition and verification results. Use device signature, as appropriate, to identify best acoustic models for recognition and verification; and A dialog manager—stuffs dialog box content into the applets, evaluates recognition and verification results as compared to configured thresholds, determines the enrollment result and the potential need for retries, interacts with other client components to manage the data and decision flow. Stores the voiceprint in the repository.

AUTHENTICATION APPLET (FIG. 4)

Construction—there are many device-specific authentication applets, for PCs, Palms, Microsoft CE devices, WAP phones and other portable devices capable of recording speech. In addition, telephony servers such as Voice mail and IVR systems are supported with authentication applets to allow voiceprint security for messaging, IVR or even agent-handled voice transactions;

Instantiation—the applet is served up by the authentication client to run on the target device or has been pre-installed on the target device. It is provided a random signature and dialog content by the authentication client;

Dialog—presents the text to instruct the user to speak the specified digit string and present the results, additionally, handles any retries required;

Records the speech—using device specific resources (e.g., windows recorder) records the utterance and formats into an audio file;

Device configuration—Reads the device configuration information and prepares it for transmission to the authentication client for use as a device signature; and Data transfer—transfers the audio file and device configuration to the authentication client.

VOICEPRINT SERVER (204)

Receives files—receives data from the authentication client for recognition and verification;

Software interface—integrates with speech recognition and verification API's to pass audio files and select appropriate grammars and acoustic models. Also receives recognition and verification results; and Voiceprint manager—manages storage and retrieval of voiceprints from the data repository.

The invention further includes a number of API's (application program interfaces), among them:

AUTHENTICATION REQUEST API

The business application requests authentication, sending the following information to the authentication client:
User id;
Network address;
Device configuration (if known);
The authentication client responds with the authentication result as follows:
User id;
Authentication pass/fail, or one of various errors (e.g., invalid user ID)

APPLET API

The signature collection and enrollment applets instantiate on the end-user device 103 and use device specific resources as follows:
Audio recorder (windows media recorder, etc); and
Device configuration file.

VOICEPRINT SERVER API

The voiceprint server interacts with speech recognition and voiceprint verification software 206 using their API's 205. It sends the following data:
Recognition request with grammar name and audio file;
Verification request with user ID and audio file; and
Results with confidence scores returned to server.

ENROLLMENT APPLET

Figure 3B:
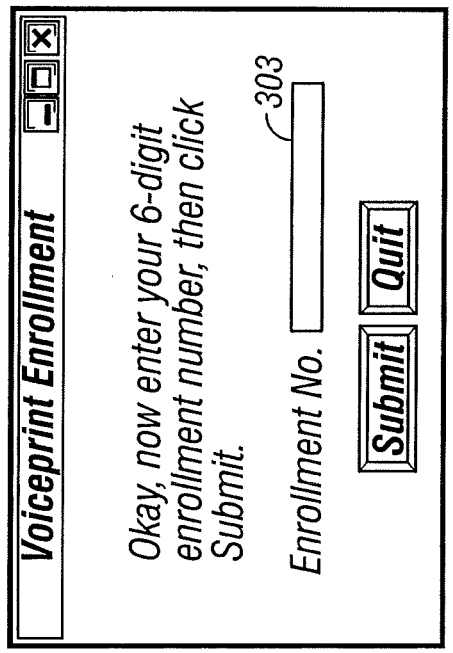
FIGS. 3A-F show a series of screen shots corresponding to the steps of an enrollment process according to the invention.
Figure 3A:
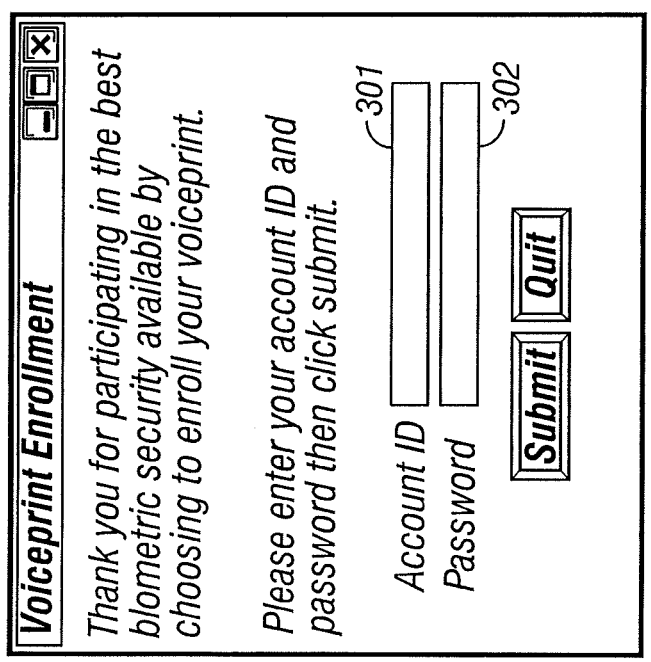
Figure 3C:
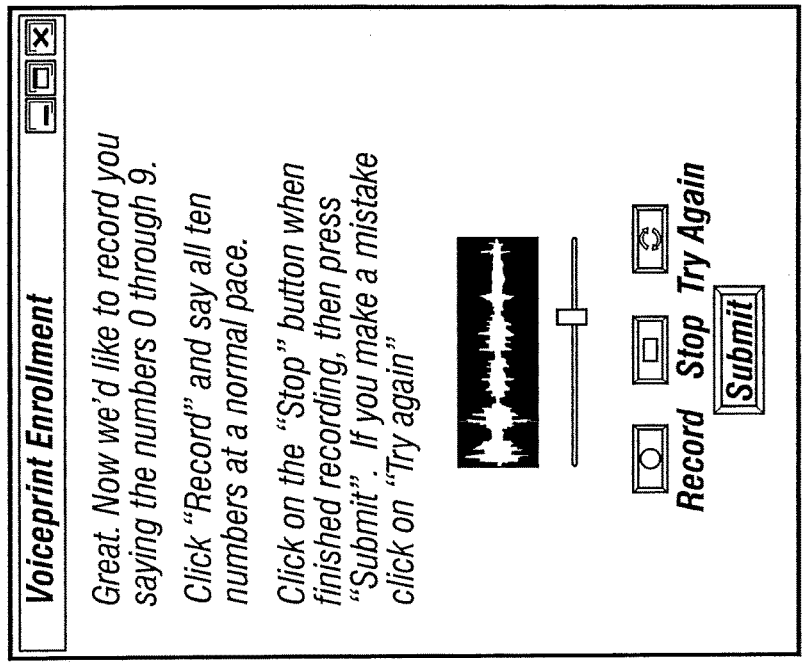
Figure 3D:
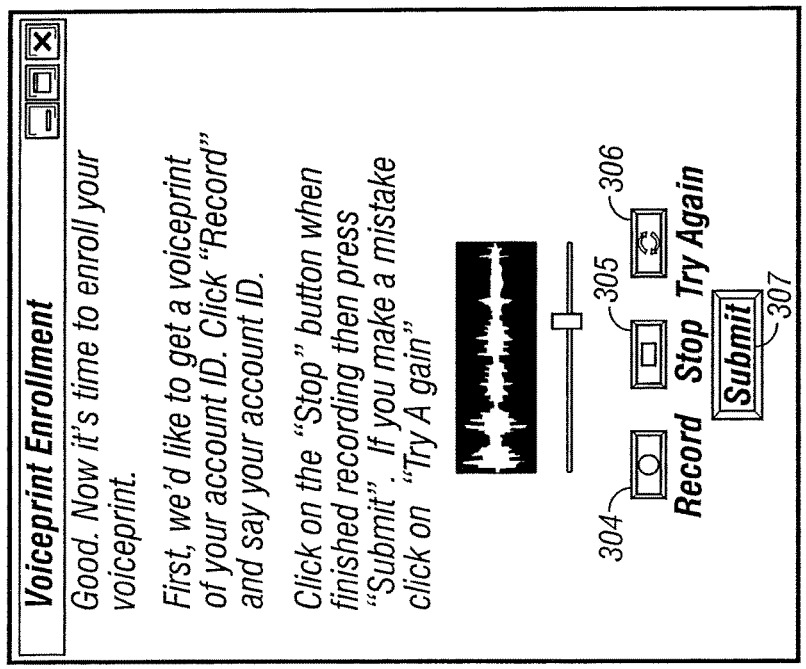
Figure 3E:
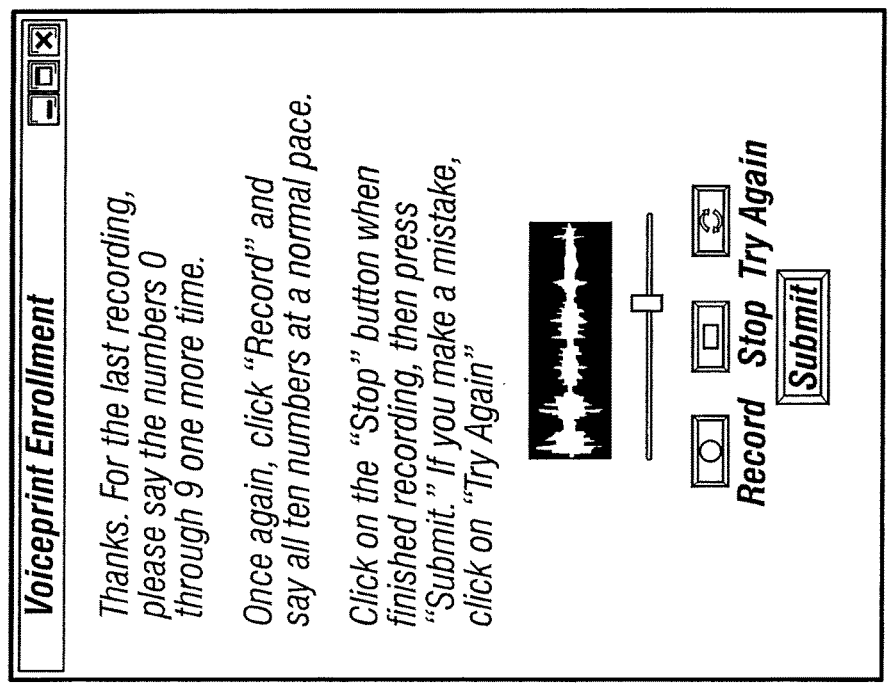

As described above, users must have previously enrolled their voiceprint on the system, prior to being able to be authenticated. FIGS. 3A-F depict the various stages of the enrollment process from the user perspective, showing dialog boxes as they are presented to the user. As FIG. 3A shows, the user first provides his Account ID 301 and password 302. As in FIG. 3B, the user is prompted to supply an enrollment number 303. As in FIGS. 3C-E the user then records his voiceprint, using controls corresponding to the user interface of the signature collection applet: 'record' 304, 'stop' 305, 'try again' 306 and 'submit' 307. Recording of the voiceprint includes the following steps, for each of which the user receives a prompt:
Record account ID (FIG. 3C);
Record the numbers 0-9 a first time (FIG. 3D); and
Record the numbers 0-9 a second time (FIG. 3E).

Figure 3F:
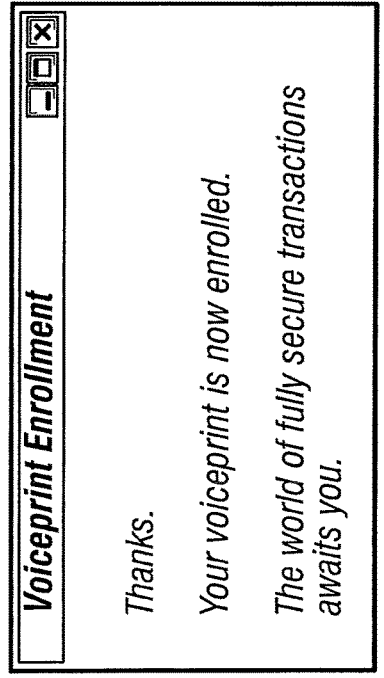

As the user finishes each utterance, he presses the 'stop' button to terminate recording, and presses the 'submit' button to send the recorded utterance. After the voiceprint is successfully enrolled and stored, the user receives a confirmation (FIG. 3F).

One skilled in the art will appreciate that the use of a random signature string for authentication, coupled with the requirement that the upper confidence thresholds for both recognition of the signature string and verification of the user be exceeded provides a important liveness check, greatly minimizing the possibility that a user's voiceprint will be compromised. In particular, the requirement that the system recognizes the signature string with a high degree of confidence provides assurance that the recorded string is genuine.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A system for securing a transaction, comprising:
an authentication server configured to:
receive, over an authentication request application programming interface, a request to authenticate an enrolled user of a client device based on a voiceprint of said user, said request originating at a third party other than said user and comprising an identification of said user and a network address of said client device;
instruct said client device at said network address to instantiate an interactive signature collection applet configured to present to said user a random signature string and record said random signature string as the user speaks said random signature string;
receive said recorded signature string and a device signature of said client device from said interactive signature collection applet;
recognize said recorded signature string using an acoustic model selected based at least in part on the device signature of said client device;
compare said recorded signature string with a stored voiceprint of said user; and
authenticate or reject said user based on a result of said comparison; and
wherein said random signature string is generated subsequent to said authentication server receiving said request; and
wherein said system is configured to initiate a telephone call to said client device and present said random signature string to said user via said telephone call.

2. The system of claim 1, wherein said third party comprises a server running a business application.

3. The system of claim 2, wherein said server running said business application comprises a telephony server.

4. The system of claim 1, wherein said request is received over one of a data network and a voice network.

5. The system of claim 1, wherein said authentication server is configured to communicate with said client device over one of a data network and a voice network.

6. The system of claim 1, wherein said authentication server receives said request by receiving signaling comprising said identification of said user, said network address of said client device and said device signature of said client device.

7. The system of claim 1, wherein said interactive signature collection applet is configured to:
present to said user said random signature string;
prompt said user to speak said random signature string;
record a spoken signature string as an audio file using device-specific recording objects;
gather said device signature by reading a configuration of said client device; and
send said audio file and said device signature to said authentication server.

8. The system of claim 1, wherein said interactive signature collection applet is configured to report an authentication result to the user.

9. The system of claim 1, wherein said interactive signature collection applet is one of:
pre-installed on said client device; and
served up from said authentication server.

10. The system of claim 1, wherein said interactive signature collection applet is software and device-specific.

11. The system of claim 1, wherein said client device includes:
a software environment capable of running said interactive signature collection applet;
sufficient memory to run said applet;
audio recording capabilities;
readable device configuration data; and
capability to send said recorded signature string and said device configuration data.

12. The system of claim 1, wherein said client device comprises one of:
a personal computer;
a WAP (wireless access protocol) telephone;
a PDA (personal digital assistant); and
a telephone configured to instantiate said interactive signature collection applet.

13. A system for securing a transaction, comprising:
an authentication server configured to:
receive a request to authenticate an enrolled user of a client device based on a voiceprint of said user from a third party other than said user, said request comprising an identification of said user and a network address of said client device;
instruct said client device at said network address to instantiate an interactive signature collection applet configured to present to said user a random signature string and record said random signature string as the user speaks said random signature string;
receive said recorded signature string from said interactive signature collection applet;
recognize said recorded signature string;
compare said recorded signature string with a stored voiceprint of said user; and
authenticate or reject said user based on a result of said comparison; and
wherein said random signature string is generated subsequent to said authentication server receiving said request; and
wherein said system is configured to initiate a telephone call to said client device and present said random signature string to said user via said telephone call.

14. The system of claim 1, wherein said interactive signature collection applet is configured to render a dialog box on said client device to present said random signature string to said user.

15. The system of claim 1, wherein said authentication server is further configured to:
determine a recognition confidence level based at least in part on a comparison of said recognized recorded signature string and said random signature string;

determine a verification confidence level based at least in part on said comparison of said recorded signature string with said stored voiceprint of said user; and authenticate said user when said recognition confidence level exceeds a threshold recognition confidence level and said verification confidence level exceeds a threshold verification confidence level.

16. The system of claim 15, wherein said interactive signature collection applet is configured to present a new random signature string to said user when one of:

said recognition confidence level exceeds said threshold recognition confidence level and said verification confidence level does not exceed said threshold verification confidence level; and said verification confidence level exceeds said threshold verification confidence level and said recognition confidence level does not exceed said threshold recognition confidence level.

17. A method comprising:

receiving, over an authentication request application programming interface, a request to authenticate an enrolled user of a client device based on a voiceprint of said user, said request originating at a third party other than said user and comprising an identification of said user and a network address of said client device;

instructing said client device at said network address to instantiate an interactive signature collection applet configured to present to said user a random signature string and record said random signature string as the user speaks said random signature string;

initiating a telephone call to said client device and presenting said random signature string to said user via said telephone call;

receiving said recorded signature string and a device signature of said client device from said interactive signature collection applet;

recognizing said recorded signature string using an acoustic model selected based at least in part on the device signature of said client device;

comparing said recorded signature string with a stored voiceprint of said user; and authenticating or rejecting said user responsive to said comparison;

wherein said random signature string is generated subsequent to receiving said request.

18. The method of claim 17, further comprising:

determining a recognition confidence level based at least in part on a comparison of said recognized recorded signature string and said random signature string;

determining a verification confidence level based at least in part on said comparison of said recorded signature string with said stored voiceprint of said user; and authenticating said user when said recognition confidence level exceeds a threshold recognition confidence level and said verification confidence level exceeds a threshold verification confidence level.

19. The method of claim 18, wherein said interactive signature collection applet is configured to present a new random signature string to said user when one of:

said recognition confidence level exceeds said threshold recognition confidence level and said verification confidence level does not exceed said threshold verification confidence level; and said verification confidence level exceeds said threshold verification confidence level and said recognition confidence level does not exceed said threshold recognition confidence level.

20. The method of claim 17, wherein said interactive signature collection applet is software and device-specific.

* * * * *